United States Patent [19]

Knapp et al.

[11] 3,901,031

[45] Aug. 26, 1975

[54] HYDROSTATIC TRANSMISSION CONTROL SYSTEM

[75] Inventors: Kenneth K. Knapp; Charles R. Cornell, both of Battle Creek, Mich.

[73] Assignee: Eaton Corporation, Cleveland, Ohio

[22] Filed: Feb. 28, 1974

[21] Appl. No.: 446,658

[52] U.S. Cl. .................... 60/395; 60/443; 60/444; 60/445; 60/490
[51] Int. Cl.[2] ........................................ F16H 39/46
[58] Field of Search ............ 60/388, 390, 443, 444, 60/445, 487, 490, DIG. 2, 368, 395

[56] References Cited
UNITED STATES PATENTS

| | | | |
|---|---|---|---|
| 2,800,769 | 7/1957 | Newell | 60/390 |
| 2,939,285 | 6/1960 | Hawkins et al. | 60/395 |
| 3,529,422 | 9/1970 | Herndon | 60/395 |

*Primary Examiner*—Edgar W. Geoghegan
*Attorney, Agent, or Firm*—Teagno & Toddy

[57] ABSTRACT

An improved hydrostatic transmission control system includes electrical control circuitry for effecting operation of a hydraulic motor to vary the effective displacement of a pump unit of a hydrostatic transmission. The control circuitry includes a potentiometer which provides a signal indicative of the actual displacement of the pump unit. A manually operable control lever actuates a second potentiometer to provide a signal indicative of a desired pump unit displacement. These signals are compared and an error signal is provided if the desired displacement is not equal to the actual displacement of the pump unit. If the error signal indicates that there is a relatively large difference between the actual and desired displacements of the pump unit, a hydraulic motor is operated at a relatively high speed to quickly change the displacement of the pump unit toward the desired displacement. As the displacement of the pump unit approaches the desired displacement, the speed of operation of the hydraulic motor is reduced so that the final adjustment of the pump unit displacement is done at a relatively slow speed to promote accuracy in adjusting the actual displacement of the pump unit to the desired displacement. In another embodiment of the invention, the electrical control circuitry is operable to vary the displacements of both the pump and motor units.

19 Claims, 6 Drawing Figures

HYDROSTATIC TRANSMISSION CONTROL SYSTEM

BACKGROUND OF THE INVENTION

The present invention relates to a hydrostatic transmission control system and more specifically to a control system for use in varying the effective displacement of one or more units of a hydrostatic transmission.

It is a common practice to utilize mechanical and hydraulic controls to vary the effective displacement of a unit of hydrostatic transmission. In addition, some electro-hydraulic controls have been utilized to regulate the displacement of a hydrostatic transmission. At least some of the known electro-hydraulic controls have been of industrial quality and have had a relatively poor performance capability as far as accuracy of control is concerned. Even though these known electro-hydraulic controls have been of industrial quality, they are too costly to compete successfully with mechanical-hydraulic controls except in the most demanding applications. The use of electro-hydraulic controls in association with hydrostatic transmissions is disclosed in U.S. Pat. Nos. 3,438,201 and 3,628,330.

The control systems disclosed in these two patents utilize proportional valves actuated by either a torque motor or a solenoid. Although control systems utilizing proportional valves are more or less satisfactory, the cost of electrically activated proportional valves is relatively high.

SUMMARY OF THE PRESENT INVENTION

The present invention is directed to a control system for varying the effective displacement of one or more units of a hydrostatic transmission. The control system advantageously includes a feedback signal generator which provides an electrical output signal indicative of the actual displacement of a unit of the hydrostatic transmission. Another signal generator may be utilized to provide an electrical command signal indicative of a desired displacement of the unit of the hydrostatic transmission. These two new signals are compared and an error signal is provided if the desired displacement does not match the actual displacement.

The error signal is utilized to effect actuation of a valve to port fluid to a hydraulic motor. The hydraulic motor is operated to vary the displacement of one unit of the hydrostatic transmission. If there is a relatively large difference between the desired displacement of the hydrostatic transmission unit and the actual displacement, a second valve is actuated to increase the rate of flow of fluid to the hydraulic motor. When the displacement of the hydrostatic transmission unit approaches the desired displacement, the second valve is closed so that the rate of operation of the hydraulic motor is reduced. Of course, this reduces the rate at which the displacement of the hydrostatic transmission unit is changed. Therefore, the displacement of the hydrostatic transmission unit approaches the desired displacement at a relatively low rate so that the first valve can be closed to interrupt operation of the hydraulic motor when the actual displacement is substantially equal to the desired displacement.

Accordingly, it is an object of this invention to provide a hydrostatic transmission control system having relatively inexpensive electro-hydraulic controls which are capable of accurately varying the displacement of one or more units of the hydrostatic transmission.

Another object of this invention is to provide a new and improved hydrostatic transmission control system which is effective to vary the displacement of at least one unit of the hydrostatic transmission at a first rate when an electrical signal indicates that the displacement of this unit differs from a predetermined displacement by relatively large amount and is effective to vary the displacement of the one unit at a reduced rate when the electrical signal indicates that the displacement of the unit is closely approaching the desired displacement.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
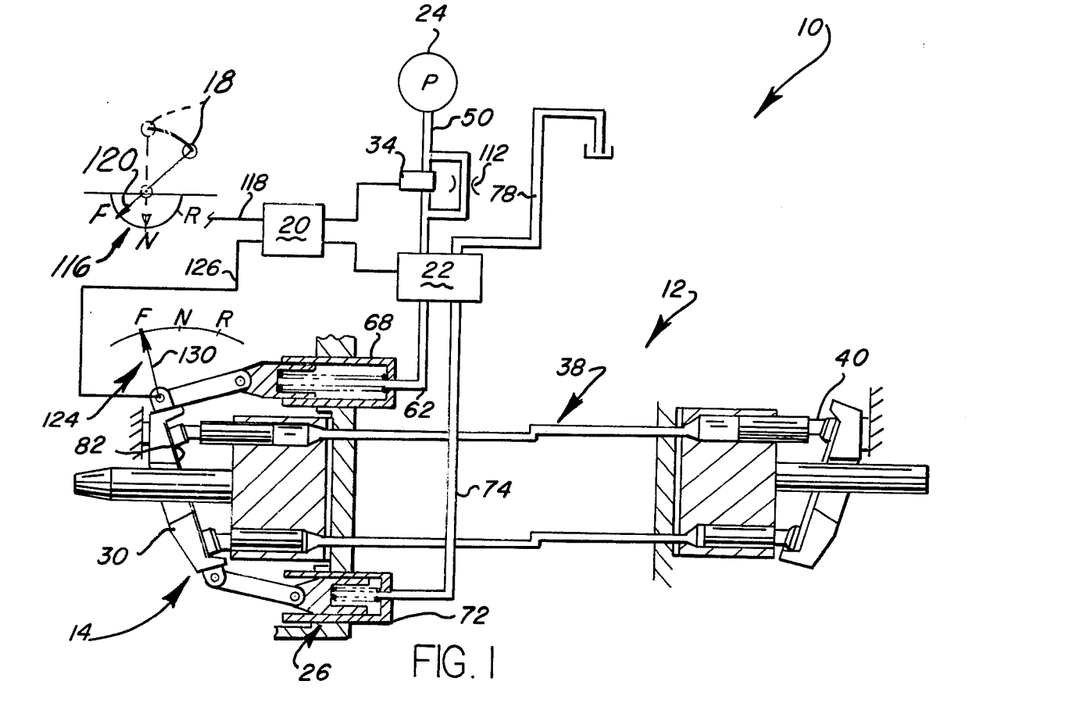
FIG. 1 is a schematic illustration of a hydrostatic transmission having a control system constructed in accordance with the present invention.

A control system 10 constructed in accordance with the present invention is illustrated in FIG. 1 in association with a hydrostatic transmission 12 having a variable displacement pump unit 14 which is driven at a substantially constant speed by a prime mover. To effect a change in the displacement of the pump unit 14, a control handle 18 is actuated. Upon actuation of the control handle 18, electric control circuitry 20 is activated to effect operation of a main control valve 22 to an open condition connecting a charge pump 24 in fluid communication with a swashplate motor assembly 26. Operation of the swashplate motor assembly 26 adjusts the output speed of the hydrostatic transmission 12 relative to the input speed at which the pump is driven by moving a swashplate 30 to vary the displacement of the pump unit 14. Under low or no load operating conditions, the output speed of the hydrostatic transmission 12 will vary as a direct function of variations in the displacement of the pump unit 14.

When the output speed of the hydrostatic transmission 12 is to be adjusted, the control handle 18 is actuated to vary a command signal indicative of a desired displacement of the pump unit 14 relative to a feedback signal indicative of the actual displacement of the pump unit. Upon a change in the command signal, the control circuitry 20 provides an error signal which effects actuation of the main valve 22. If the difference between the actual displacement of the pump unit 14 and the desired displacement of the pump unit is relatively large, a rate control valve 34 is actuated to provide a relatively high rate of flow of fluid to the swashplate motor assembly 26. Of course, this relatively high rate of fluid flow causes the swashplate motor assembly 26 to quickly vary the displacement of the pump unit 14. In order to provide for accurate positioning of the swashplate 30 by the swashplate motor assembly 26, when the displacement of the pump unit 14 closely approaches the desired displacement, the control circuitry 20 effects operation of the rate control valve 34 to reduce the flow of fluid to the swashplate motor assembly and the rate at which the swashplate is moved.

When the control handle 18 is in a neutral position, indicated in dashed lines in FIG. 1, the pump unit 14 is in a neutral condition and has a substantially zero effective displacement. At this time the pump unit 14 is ineffective to transmit fluid through a hydrostatic loop 38 connecting the pump unit with a fixed displacement motor unit 40. Therefore, when the pump unit 14 is in a neutral condition, the motor unit 40 is ineffective to drive an associated load. Although the motor unit 40 is of the well known rotary type, it is contemplated that the hydrostatic transmission 12 could be constructed with a different type of motor unit, for example a linear motor unit. It is also contemplated that the hydrostatic transmission 12 could have the fluid return line from the motor connected with drain or reservoir. If this was done, the pump unit 14 would have an intake connected with drain.

Upon movement of the control handle 18 to a forward actuated position (shown in solid lines in FIG. 1), the electrical control circuitry 20 energizes a solenoid 44 (see FIG. 2) to actuate a pilot valve 46 in the main valve assembly 22. Actuation of the pilot valve 46 ports high pressure fluid from conduits 50 and 52 to a conduit 54 connected in communication with a pressure chamber 56 in a directional control valve 58. The relatively high fluid pressure in the chamber 56 rapidly moves the directional control valve 58 downwardly (as viewed in FIG. 2) to a fully open position to connect a fluid supply conduit 60 in fluid communication with a conduit 62 through a valve passage 64. The conduit 62 is connected in fluid communication with a motor cylinder 68 (FIG. 1) of the swashplate motor assembly 26. In addition, actuation of the directional control valve 58 connects an opposite motor cylinder 72 in fluid communication with tank or drain through a conduit 74, valve passage 76, and a conduit 78.

The flow of high pressure fluid through the conduit 62 to the motor cylinder 68 pivots the swashplate 30 in a counterclockwise direction (as viewed in FIG. 1) from a neutral position in which a reaction surface 82 on the swashplate extends generally vertically (as viewed in FIG. 1) to a fully forward actuated position shown in FIG. 1. When the swashplate motor assembly 26 has moved the swash-plate 30 to a position in which the pump unit 14 has a displacement corresponding to the position of the manually actuated control handle 18, the electrical control circuitry 20 deenergizes the solenoid 44 and the spring biased pilot valve 46 returns to the closed condition of FIG. 2. When this occurs, the fluid pressure in the chamber 56 and conduit 54 is conducted to drain through an orifice 86. As the fluid pressure in the actuating chamber 56 is reduced, the spring biased directional control valve 58 is rapidly returned to the closed or unactuated condition of FIG. 2 to block fluid flow to and from the motor cylinders 68 and 72 through the conduits 62 and 74. This hydraulically locks the swashplate motor assembly 26 so that the swashplate 30 is held in a position in which the pump unit 14 has a displacement corresponding to the position of the control handle 18. Under light or no load conditions, the forward output speed of the motor unit 40 will also correspond to the position of the control handle.

Upon operation of the control handle 18 in a reverse direction, that is upon pivoting of the control handle in a counterclockwise direction from the neutral position illustrated in dashed lines in FIG. 1, a solenoid 90 is energized by the control circuitry 20. Energizing the solenoid 90 (FIG. 2) effects operation of a pilot valve 92 to conduct fluid to a second pressure chamber 94. The fluid pressure in the chamber 94 operates the directional control valve 58 to a reverse actuated condition in which the relatively high pressure fluid from the conduit 60 is conducted through a valve passage 96 to the conduit 74 leading to the motor cylinder 72. At the same time, the motor cylinder 68 is connected with drain through the conduit 62 and a valve passage 98. This results in operation of the swashplate motor assembly 26 to pivot the swashplate 30 in a clockwise direction (as viewed in FIG. 1) to a position in which the pump unit 14 has a displacement corresponding to the position of the manually actuated control handle 18. At this time, the pump unit 14 is effective to transmit fluid pressure to the hydrostatic loop 38 in such a manner as to drive the motor 40 in a reverse direction. Under light or no load conditions, the reverse output speed of the motor unit 40 will also correspond to the position of the control handle 18. It should be noted that the valve 58 is rapidly operated between the fully open and fully closed positions upon energization or deenergization of either of the solenoids 44 or 90.

Figure 2:
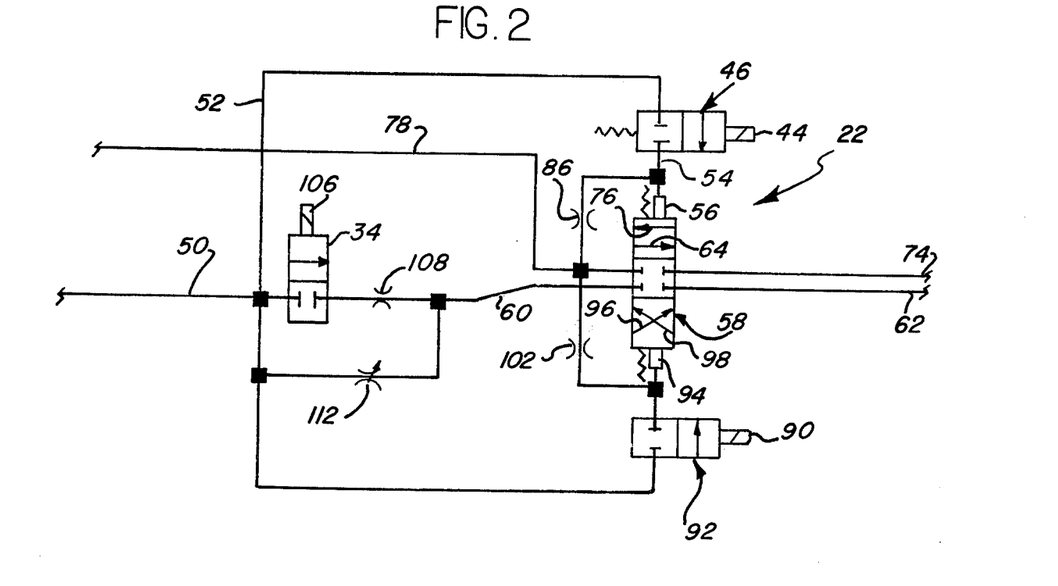
FIG. 2 is a schematic illustration of hydraulic controls utilized in the hydrostatic transmission control system of FIG. 1.

When the pump unit 14 has a reverse displacement corresponding to the position of the handle 18 at "R" in FIG. 1, the control circuitry 20 deenergizes the solenoid 90 and the spring biased pilot valve 92 returns to the closed condition of FIG. 2. The relatively high fluid pressure in the chamber 94 is then reduced to tank pressure through an orifice 102. As this occurs, the spring biased directional control valve 58 moves back to the closed or unactuated condition of FIG. 2 blocking fluid flow to and from the swashplate motor assembly 26. The general construction of the swashplate motor assembly 26 is the same as is disclosed in U.S. Pat. application Ser. No. 248,685, filed Apr. 28, 1972, now U.S. Pat. No. 3,795,109, granted March 5, 1974 by Edward J. Bojas and Harold R. Ward and entitled "Hydrostatic Transmission Drive System."

In accordance with one feature of the present invention, upon movement of the control handle 18, the swashplate motor assembly 26 is operated at a relatively high speed to move the swashplate 30 to a position in which the pump unit 14 has a displacement closely approaching a displacement represented by the position of the control handle. To enable the swashplate motor assembly 26 to accurately position the swashplate 30, the speed of operation of the swashplate motor assembly is reduced during the final portion of movement of the swashplate to the desired position. By operating the swashplate motor assembly 26 to quickly move the swashplate 30 to a position closely approaching the desired position and then decreasing the speed of operation of the motor assembly 26, the swashplate can be quickly and accurately moved to a position corresponding to a desired displacement upon actuation of the control handle 18.

To effect relatively high speed operation of the swashplate motor assembly 26, a solenoid 106 (see FIG. 2) is energized to operate the rate control valve 34 from the closed condition of FIG. 2 to an open condition. When the rate control valve 34 is in the closed condition, it blocks fluid flow from the charge pump 24 to a high flow rate orifice 108 having a relatively wide throat. Therefore, if the directional control valve 58 is operated to either a forward or reverse open condition with the rate control valve 34 closed, all of the fluid which flows to the swashplate motor assembly 26 must pass through a low flow rate orifice 112 which is adjustable to provide a flow rate which corresponds to a desired minimum operating speed of the swashplate motor assembly 26.

Upon operation of the rate control valve 34 to the open condition with the directional control valve 58 in either a forward or reverse actuated condition, fluid can flow at a relatively high rate through the valve 34, orifice 108 directional control valve 58 to effect high speed operation of the swashplate motor assembly 26. Although the high flow rate orifice 108 has been shown as having a fixed throat diameter, it is contemplated that the orifice could be adjustable to provide a flow rate corresponding to a desired maximum operating speed of the swashplate motor assembly 26.

When the displacement of the pump unit 14 closely approaches a displacement corresponding to the position of the control handle 18, the solenoid 106 is deenergized. The spring biased flow rate control valve 34 is then closed and fluid flows at a relatively low rate to the swashplate motor assembly 26. This results in a reduction in the speed at which the swashplate 30 is moved to enable it to be accurately positioned.

The control system 10 is effective to compare the actual displacement of the pump unit 14 with a desired displacement corresponding to the position of the control handle 18. A signal generator 116 (FIG. 1) provides a command signal indicative of the desired displacement of the pump unit 14. This command signal is conducted over a lead 118 to the electrical control circuitry 20. In the embodiment of the invention illustrated in FIG. 1, the signal generator 116 is a potentiometer having a movable pointer 120 (see FIG. 3) which is moved relative to a fixed resistance 122 to vary the voltage of a signal transmitted through the line 118 in a known manner as the position of the control handle 18 is varied. Therefore, the voltage of the command signal transmitted from the potentiometer 116 to the electrical control circuitry 20 is indicative of the position of the control handle 18.

A second signal generator 124 (see FIG. 1) provides a feedback signal indicative of the position of the swash-plate 30 and, therefore, the displacement of the pump 14. The feedback signal is conducted over a lead 126 to the electrical control circuitry 20. The signal generator 124, like the signal generator 116, is a potentiometer having a pointer 130 (see FIG. 3) which cooperates with a fixed resistance 132 to provide a feedback signal with a voltage which varies directly as a function of variations in the displacement of the pump unit 14. Therefore, the voltage conducted over the lead 126 is indicative of the actual displacement of the pump unit 14 at any given time.

The electrical control circuitry 20 is effective to compare the command signal from the signal generator 116 with the feedback signal from the signal generator 124 to determine if the displacement of the pump unit 14 corresponds to the position of the control handle 18. If the feedback and command signals do not correspond to the same displacement of the pump unit 14, the electrical control circuitry 20 energizes one of the pilot valve solenoids 44 or 90 to actuate the directional control valve 58 to a forward or reverse actuated condition (see FIG. 2). If there is a relatively large difference between the displacement indicated by the command signal from the signal generator 116 and the feedback signal from the signal generator 124, the electrical control circuitry 20 energizes the rate control valve solenoid 106 (FIG. 2) to effect high speed operation of the swashplate motor assembly 26. When the feedback signal has closely approached the command signal, the electrical control circuitry 20 deenergizes the solenoid 106 to close the rate control valve 34 and effect low speed operation of the swashplate motor assembly 26 in the manner previously explained.

To provide for a comparison of the command and feedback signals, the control circuitry 20 (see FIG. 3) includes a summing junction 140. A command signal is transmitted to the summing junction 140 by the lead 118. A feedback signal is transmitted to the summing junction 140 by an amplifier 141. If the displacement of the pump unit 14 is the same as the displacement indicated by the position of the control handle 18, an inverting amplifier 143 provides a predetermined reference voltage $V_0$ on a lead 142.

If the control handle 18 is moved to a forward actuated position corresponding to a greater displacement than the actual displacement of the pump unit 14, the error signal voltage on the lead 142 is less than the reference voltage $V_0$. Similarly, if the control handle 18 is moved to a reverse actuated position corresponding to a reverse displacement which is greater than the actual reverse displacement of the pump unit 14, the error signal voltage on the lead 142 is greater than the reference voltage $V_0$.

The error signal voltage is applied to a plurality of comparator or operational amplifiers 146, 148, 150 and 152. During forward operation of the pump unit 14, the error signal voltage is less than the reference voltage $V_0$ only when the actual forward displacement of the pump unit is less than the desired forward displacement. This results in a reduced output signal from the amplifier 146 to activate a PNP transistor 154 and energize the forward pilot valve solenoid 44 (see FIG. 2). As previously explained, this results in an increase in the forward operating displacement of the pump unit 14.

During reverse operation of the pump unit 14, the error signal voltage is less than the reference voltage $V_0$ only when the actual reverse displacement of the pump unit 14 is greater than the desired displacement corresponding to the position of the control handle 18. The relatively low error signal voltage enables the amplifier 146 to effect energization of the solenoid 44. This results in a reduction in the reverse displacement of the pump unit 14 to the desired displacement.

During reverse operation of the pump unit 14, the error signal voltage is greater than the reference voltage $V_0$ only when the actual reverse displacement of the pump unit 14 is less than the desired displacement indicated by the position of the control handle 18. The relatively high error signal voltage enables the amplifier 148 to activate a PNP transistor 158 to energize the pilot valve solenoid 90. This effects operation of the directional control valve 58 to a reverse actuated condition in which the reverse operating displacement of the pump unit 14 is increased.

During forward operation of the pump unit 14, the error signal voltage is greater than the reference voltage $V_0$ only when the actual forward displacement of the pump unit 14 is greater than the desired displacement indicated by the position of the control handle 18. The relatively high error signal voltage enables the amplifier 148 to activate the transistor 158 to energize the pilot valve solenoid 90. This results in operation of the swashplate motor assembly 26 to reduce the displacement of the pump unit 14.

If the displacement of the pump unit 14 differs from the desired displacement indicated by the position of the control handle 18 by more than a predetermined amount, the error signal effects activation of either the amplifier 150 or the amplifier 152 to render a PNP transistor 162 conducting to effect energization of the rate control valve solenoid 106. Thus, if the forward operating displacement of the pump unit 14 is to be increased by more than a predetermined amount or if the reverse operating displacement of the pump unit is to be decreased by more than a predetermined amount, the amplifier 150 is activated to effect energization of the rate control solenoid 106. Similarly, if the reverse operating displacement of the pump unit 114 is less than a desired operating displacement or if the forced operating displacement of the pump unit 14 is greater than the desired operating displacement by more than a predetermined amount, the amplifier 152 is activated to effect energization of the solenoid 106.

When the pump unit 14 is in a neutral position and the control lever 18 is in a neutral position, the reference voltage $V_0$ is connected to each of the amplifiers 146 through 152. However, the voltage $V_0$ is of a magnitude such that all of the amplifiers 146 through 152 have relatively high voltage outputs. Therefore, the solenoids 44, 90 and 106 remain in a deenergized condition in which the main valve assembly 22 and rate control valve 34 are closed blocking fluid flow to and from the swashplate motor assembly 26 to hydraulically lock the pump unit 14 in the neutral condition.

Upon movement of the control handle 18 from the neutral condition to a forward actuated condition (illustrated in FIG. 1) with the pump unit 14 in a neutral displacement condition, a pointer 120 of the potentiometer 116 is moved to increase the voltage of the command signal. This results in an increase in the current at the summing junction 140 which is connected with an inverting terminal 165 of the amplifier 143. The amplifier 143 is then effective to reduce the voltage on lead 142 to a voltage below the reference voltage $V_0$. This reduced voltage is applied to a noninverting terminal 166 of the amplifier 146 so that the voltage of the output from the amplifier 146 to the transistor 154 is reduced to render the transistor conducting to effect energization of the forward pilot valve solenoid 44 (see FIG. 2). Upon energization of the pilot valve solenoid 44, the directional control valve 58 is actuated to forward operating condition in the manner previously explained.

The reduced voltage error signal is also applied to a noninverting terminal 174 of the amplifier 150. If the displacement of the pump unit 14 is less than the displacement indicated by the position of the control handle 18 by more than a predetermined amount, the voltage of the error signal conducted to the noninverting terminal 174 of the amplifier 150 will be below the threshold voltage for the amplifier. This results in the application of a relatively low voltage to an output lead 176. This relatively low voltage dominates the output of the amplifier 152 to render the transistor 162 conducting. This energizes the rate control valve solenoid 106 to open the rate control valve 34. As was previously explained, upon opening of the rate control valve 34, the swashplate motor assembly 26 is operated at a relatively high speed. Since the directional control valve 58 has been actuated to a forward operated condition, the swashplate motor assembly 26 is operated at a relatively high speed to increase the forward displacement of the pump unit 14 toward a displacement corresponding to the position of the control handle 18.

As the forward displacement of the pump unit 14 approaches the displacement indicated by the control handle 18, the relatively low voltage of the error signal approaches the reference voltage $V_0$. When the error signal is less than the reference voltage $V_0$ by a predetermined amount, the displacement of the pump unit 14 is less than the displacement indicated by the control handle 18 by a predetermined amount. The next increment of movement of the swashplate 30 causes the error signal voltage to rise above the threshold voltage of the amplifier 150. This results in the voltage in the line 176 being increased to render the transistor 162 nonconducting so that the rate control valve solenoid 106 is deenergized. When this occurs, the rate control valve 34 is closed to decrease the rate of flow of fluid to the swashplate motor assembly 26. This results in relatively slow operation of the swashplate motor assembly 26 to move the swashplate 30 to a position corresponding to the displacement indicated by the control handle 18. The voltage on the lead 142 is then equal to the reference voltage $V_0$. When this occurs, the transistor 154 is rendered nonconducting to deenergize the solenoid 44 and effect operation of the directional control valve from a forward actuated condition to the neutral condition shown in FIG. 2.

It should be noted that the amplifier 148 is ineffective to energize the solenoid 90 when the error signal is less than the reference voltage $V_0$. This is because the error signal is applied to an inverting terminal 180 of the amplifier 148 so that a reduction in error signal voltage tends to render the output of the amplifier 148 more positive and the transistor 158 remains in a nonconducting condition. Similarly, the amplifier 152 is uneffected by a reduction in the error signal voltage to a voltage below the reference voltage $V_0$ since the error signal is conducted to an inverting terminal 184 of the amplifier 152.

When the forward operating displacement of the pump unit 14 is to be decreased, the control handle 18 is moved in a counterclockwise direction from the forward actuated position shown in solid lines in FIG. 1 toward the neutral position shown in dashed lines in FIG. 1. As this occurs, the command signal conducted to the summing junction 40 is decreased. This effects an increase in the voltage of the error signal on the lead 142 to a voltage which is greater than the reference voltage $V_0$. This increased voltage is transmitted to the inverting terminal 180 of the amplifier 148 to decrease the voltage of the output signal from the amplifier and render the transistor 158 conducting. This results in energization of the pilot valve solenoid 90. Upon energization of the pilot valve solenoid 90, the directional control valve 58 is operated to a reverse actuated condition to effect operation of the swashplate motor assembly 26 to reduce the forward operating displacement of the pump unit 14.

The increased voltage of the error signal is also applied to the inverting terminal 184 of the amplifier 152. If the actual displacement of the pump unit 14 exceeds the displacement indicated by the position of the control handle 18 by more than a predetermined amount, the voltage of the error signal will exceed the reference voltage by an amount sufficient to exceed the threshold level of the amplifier 152. When this occurs, the output of the amplifier 152 dominates the output of the amplifier 150 and renders the PNP transistor 162 conducting. This energizes the rate control valve solenoid 106 to operate the rate control valve 34.

Operation of the rate control valve 34 results in relatively high speed operation of the swashplate motor assembly 26 to quickly reduce the displacement of the pump unit 14 toward the displacement indicated by the position of the handle 18. When the forward operating displacement of the pump unit 14 is just slightly greater than the displacement indicated by the position of the control handle 18, the error signal voltage has decreased to a voltage which is less than the threshold voltage of the amplifier 152 so that the transistor 162 is rendered nonconducting. This results in deenergization of the rate control valve solenoid 106 and relatively slow speed operation of the swashplate motor assembly 26 to slowly move the swashplate 30 through the final distance to the position corresponding to the position of the control handle 18. When the swashplate reaches this position, the error signal voltage on the lead 142 will again be equal to the reference voltage $V_0$ and the output of the amplifier 148 will become positive with a resulting deenergization of the pilot valve solenoid 90.

Upon movement of the control handle 18 to a reverse actuated position, that is in a counterclockwise direction from the neutral position indicated by dashed lines in FIG. 1, the electrical control circuitry 20 effects operation of the main valve assembly 22 and rate control valve 34 in a manner similar to that described in connection with forward operation of the vehicle. Thus, upon movement of the control handle 18 from the neutral position to a reverse actuated position, the current at the summing junction 140 is decreased to effect an increase in the voltage of the error signal on the lead 142. This increase in voltage is applied to the inverting terminal 180 of the amplifier 148. The resulting drop in the output voltage of the amplifier 148 renders the transistor 158 conducting to energize the pilot valve solenoid 90 to effect operation of the directional control valve 58 from the neutral condition illustrated in FIG. 2 to a reverse actuated condition in which fluid under pressure from the conduit 60 is conducted to the swashplate motor assembly 26 through the conduit 74. Of course, this results in operation of the swashplate motor assembly 26 to increase the reverse operating displacement of the pump unit 14.

If the control handle 18 is moved through a relatively large distance so that there is a substantial difference between the initial position of the swashplate 30 and the position to which it is to be moved, the increase in voltage applied to the inverting terminal 184 of the amplifier 152 exceeds the threshold level of the amplifier with a resulting relatively low voltage output from the amplifier 152. The transistor 162 is then rendered conducting to effect energization of the rate control valve solenoid 106.

Upon energization of the solenoid 106, the rate control valve 34 is actuated to an open condition to increase the rate of fluid flow to the swashplate motor assembly 26 through the conduit 74. This increased fluid flow rate causes the swashplate motor assembly 26 to quickly move the swashplate 30 to a reverse operating position corresponding to the displacement indicated by the control handle 18. When the reverse operating displacement of the pump unit 14 closely approaches the displacement corresponding to the position of the control handle 18, the voltage of the error signal is below the threshold voltage level of the amplifier 152 so that the transistor 162 is rendered nonconducting with a resulting deenergization of the rate control solenoid 106. As was previously explained, this results in a decrease in the operating speed of the swashplate motor assembly 26 to enable the swashplate to be slowly and accurately located at a position corresponding to the position of the control handle 18.

Upon movement of the control handle 18 from a reverse actuated position to the neutral position illustrated in dashed lines in FIG. 1, the error signal at the summing junction 140 is increased. The resulting decrease in error signal voltage on line 142 effects energization of the pilot valve solenoid 44 and operation of the directional control valve 58 to a forward actuated position. The swashplate motor assembly 26 is then operated to pivot the swashplate 30 in a counterclockwise direction from a position corresponding to a reverse operating displacement toward the neutral displacement condition.

If the reverse operating displacement of the pump unit 14 exceeds the neutral displacement to which the control handle 18 is moved by a substantial amount, the error signal will decrease by a sufficient amount to exceed the threshold level of the amplifier 150 with a resulting energization of the rate control valve solenoid 106. As was previously explained, this results in operation of the rate control valve 34 to port an increased flow of fluid pressure to the directional control valve 58 to effect high speed operation of the swashplate motor assembly 26. When the swashplate 30 is moved to a position closely approximating the neutral position, the error signal will fall below the threshold level of the amplifier 150 with a resulting deenergization of the rate control valve solenoid 106. The swashplate motor assembly 26 will then be effective to slowly accurately position the swashplate 30 in the neutral position.

When the displacement of the pump unit 14 is maintained at a desired operating displacement for a relatively long period of time, leakage may occur around the pistons of the swashplate motor assembly 26. As this leakage occurs, the reaction forces of the swashplate 30 tend to move it from a position corresponding to a predetermined operating displacement toward the neutral condition. As this occurs, the output signal from the feedback signal generator 124 is varied. This results in an error signal which effects operation of either the forward or reverse pilot valve solenoid 44 or 90 to operate the directional control valve 58 to compensate for the leakage. Of course, the minimum flow rate through the variable orifice 112 to the directional control valve 58 exceeds the leak-down rate of the swashplate motor assembly 26 by an amount sufficient to enable the leakage to be compensated for without opening the rate control valve 34 to effect high speed operation of the swashplate motor assembly 26.

Figure 3:
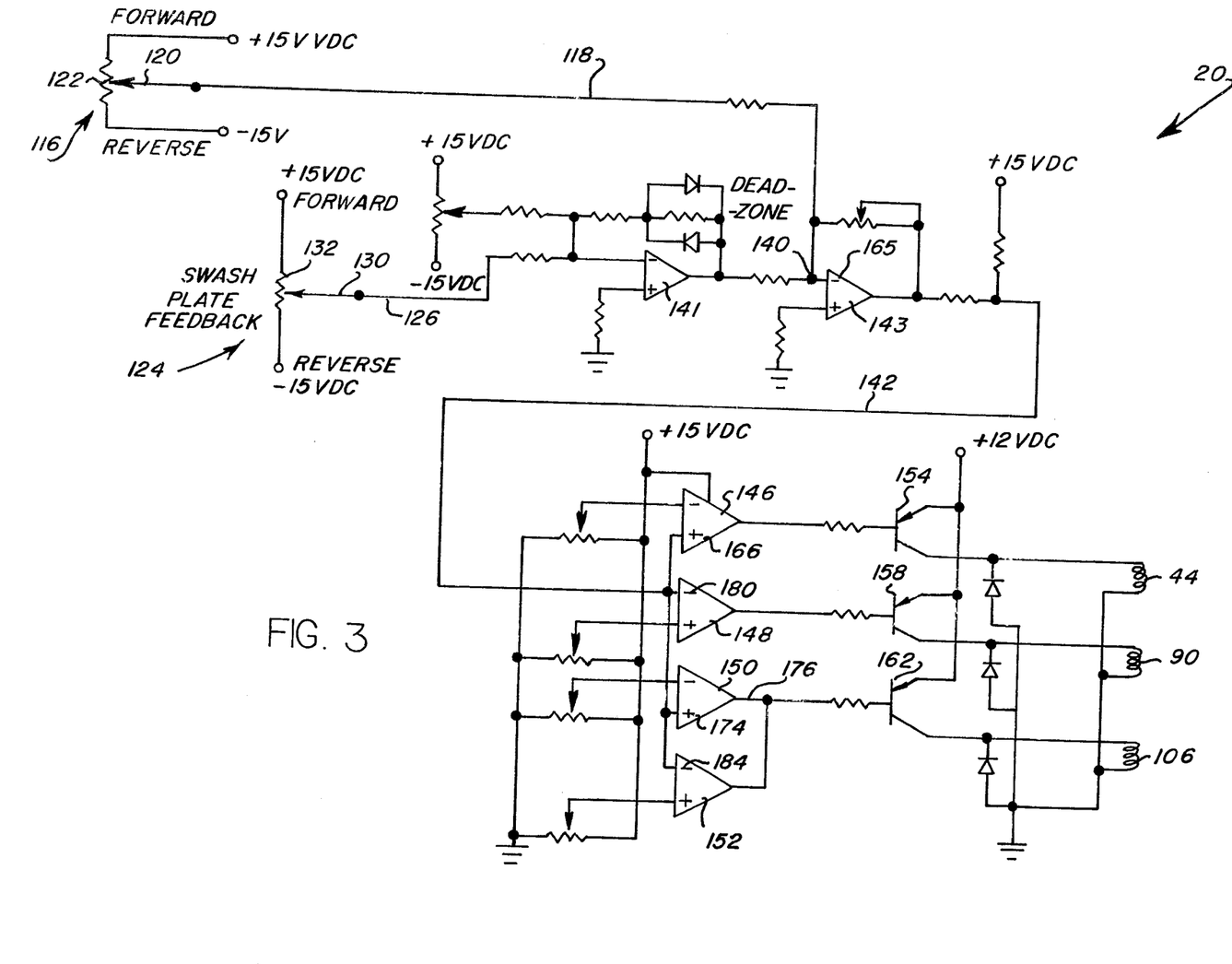
FIG. 3 is a schematic illustration of electrical controls utilized in the hydrostatic transmission control system of FIG. 1.

In the embodiment of the invention illustrated in FIGS. 1–3, the control system 10 is utilized to regulate the displacement of only the pump unit 14. In the embodiment of the invention illustrated in FIGS. 4 and 5, a control system 200 is utilized in association with the hydrostatic transmission 202 having variable displacement pump and motor units. Since the control system 200 and hydrostatic transmission 202 have many components which are the same as components utilized in association with the embodiment of the invention illustrated in FIGS. 1–3, similar numerals will be utilized to designate similar components, the suffix letter *a* being utilized with numerals associated with the embodiment of the invention of FIGS. 4 and 5 to avoid confusion.

The hydrostatic transmission 202 (FIG. 4) includes a variable displacement pump unit 14a and motor 40a. The pump unit 14a is driven at a substantially constant speed by a prime mover. To effect a change in the displacement of the pump unit 14a, a control handle 18a is actuated. Upon actuation of the control handle 18a, electrical control circuitry 20a is activated to effect operation of a main control valve 22a to an open condition connecting a charge pump 24a in fluid communication with a swashplate motor assembly 26a. Operation of the swashplate motor assembly 26a varies the displacement of the pump unit 14a to adjust the output speed of the hydrostatic transmission 202.

If a relatively large change is to be made in the displacement of the pump unit 14a, the control circuitry 20a opens a rate control valve 34a to increase the rate at which fluid is ported to the swashplate motor assembly 26a. The manner in which the control circuitry 20a cooperates with the main control valve 22a and rate control valve 34a to effect operation of the pump swashplate motor assembly 26a is the same as was previously described in connection with the embodiment of the invention illustrated in FIGS. 1–3.

Figure 4:
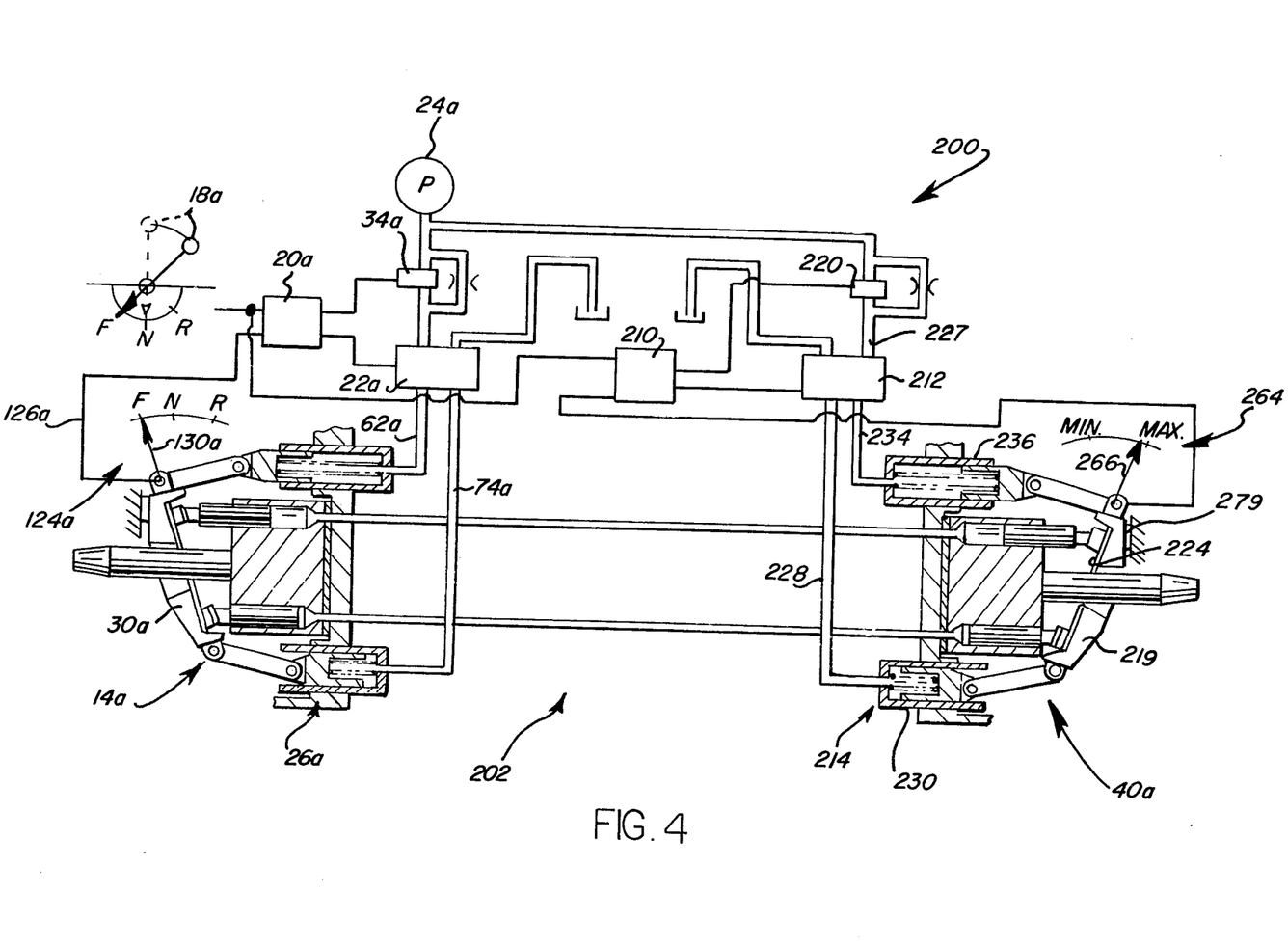
FIG. 4 is a schematic illustration of a second embodiment of the invention in which a control system constructed in accordance with the invention is utilized to vary the displacement of pump and motor units of a hydrostatic transmission.

In accordance with a feature of the embodiment of the invention illustrated in FIG. 4, the control handle 18a may be actuated to vary the output speed of the hydrostatic transmission 202 by such a large amount that merely changing the displacement of the pump unit 14a is ineffective to provide the desired change in output speed. When this occurs, control circuitry 210 is activated to effect operation of a main control valve assembly 212 to an open condition connecting the charge pump 24a in fluid communication with a swashplate motor assembly 214. Operation of the swashplate motor assembly 214 adjusts the output speed of the hydrostatic transmission 202 by moving a motor unit swashplate 216 to vary the displacement of the motor unit 40a. If the displacement of the motor unit 40a is to be varied by a relatively large amount, the electrical control circuitry 210 opens a rate control valve 220 to increase the rate at which fluid is ported to the swashplate motor assembly 214.

When the output speed of the hydrostatic transmission 202 is to be increased by a relatively large amount, the control handle 18a is moved to a fully forward position, as illustrated in solid lines in FIG. 4. This effects operation of the swashplate motor assembly 26a to move the swashplate 30a to the fully forward position illustrated in FIG. 4 in which the pump unit 14a has a maximum forward displacement. At the same time, the control circuitry 210 opens the main control valve assembly 212 to effect operation of the swashplate motor assembly 214 to decrease the displacement of the motor unit 40a from the maximum displacement condition illustrated in FIG. 4 toward a minimum displacement condition. When the motor unit 40a has a minimum displacement, a reaction surface 224 on the swashplate 216 is almost vertical (as viewed in FIG. 4). As the swashplate motor assembly 214 is operated to decrease the displacement of the motor unit 40a, the output speed of the hydrostatic transmission 202 is increased.

The rate control valve 220 and main control valve assembly 212 have the same construction as the rate control valve 34 and main control valve 22. It should be noted that the main control valve 212 includes a directional valve, similar to the directional valve 58 of FIG. 2, and is rapidly operable between a closed position blocking fluid flow to and from the swashplate motor assembly 214 and either one of two fully open positions. Solenoid actuated pilot valves are provided to effect rapid operation of the directional valve in the main control valve assembly.

Upon operation of one of the pilot valves, the main control valve assembly 212 is actuated to an accelerate condition. When this occurs, high pressure fluid flows from conduit 227 through valve passages, similar to the passage 96 of FIG. 2, to a conduit 228 and motor cylinder 230. The high pressure fluid effects movement of the swashplate 216 in a counterclockwise direction (as viewed in FIG. 4) to reduce the effective displacement of the motor unit 40a. Of course, this increases the output speed of the hydrostatic transmission 202.

Similarly, upon operation of another pilot valve, the main control valve assembly 212 is actuated to a decelerate condition. When the valve assembly 212 is in a decelerate condition, high pressure fluid flows through a valve passage, similar to the passage 64 of FIG. 2, to the second conduit 234 connected with motor cylinder 236. If the swashplate 216 is in a position other than the maximum displacement position of FIG. 4, the swashplate is moved in a clockwise direction toward the maximum displacement condition. As the swashplate 216 moves toward the maximum displacement condition, the output speed of the hydrostatic transmission 202 decreases.

The pilot valve for operating the directional control valve in the main valve assembly 212 to an accelerate condition in which fluid is ported to the conduit 228 is actuated upon energization of a solenoid 242 (see FIG. 5B) in the same manner as in which the pilot valve 92 is actuated upon energization of the solenoid 90. Similarly, upon energization of a solenoid 240, the directional control valve in the main valve assembly 212 is actuated to the decelerate condition porting fluid to conduit 234. The rate control valve 220 is actuated to an open condition upon energization of a solenoid 246 (FIG. 5B) in the same manner in which the rate control valve 34 is open upon energization of the solenoid 106.

The inner action between the main control valve 212, rate control valve 220 and swashplate motor assembly 214 is the same as described in connection with the main control valve 22, rate control valve 34 and swashplate motor assembly 26 of FIGS. 1 and 2. Therefore, the construction and inner action of these components will not be further described herein. It should be noted that the construction of the swashplate motor assembly 214 and the manner in which the speed of the hydrostatic transmission 202 is varied upon variation in the displacement of the motor unit 40a is the same as is described in the aforementioned Bojas and Ward application Ser. No. 248,685, filed Apr. 28, 1972, and entitled Hydrostatic Transmission Drive System.

The control system 200 is effective to compare the actual displacement of the pump unit 14a and motor unit 40a with a desired displacement corresponding to the position of the control handle 18a. A signal generator 116a provides a command signal indicative of the desired displacement of both the pump unit 14a and motor unit 40a. This command signal is conducted over a lead 118a to the electrical control circuitry 20a. A second signal generator 124a provides a feedback signal indicative of the position of the swashplate 30a of the pump unit 14a. The pump unit displacement feedback signal is conducted over a lead 126a to the electrical control circuitry 20a. The electrical control circuitry 20a is effective to compare the command signal from the signal generator 116a and the feedback signal generator 124a to determine if the displacement of the pump unit 14a corresponds to the position of the control handle 18a. Although known types of apparatus could be utilized to provide feedback and command signals, the signal generators 116a and 124a are potentiometers.

If the feedback and command signals do not correspond to the same displacement of the pump unit 14a, the electrical control circuitry 20a energizes one of the pilot valve solenoids 44a or 90a (see FIG. 5B) to actuate the directional control valve in the main control valve assembly 22a. If there is a relatively large difference between the displacement indicated by the command signal from the signal generator 116a and the feedback signal from the signal generator 124a, the electrical control circuitry 20a energizes the rate control valve solenoid 106a (see FIG. 5B) to effect high speed operation of the swashplate motor assembly 26a. When the feedback signal has closely approached the command signal, the electrical control circuitry 20a deenergizes the solenoid 106a to close the rate control valve 34a and effect low speed operation of the swashplate motor assembly 26a. The manner in which the control circuitry 20a cooperates with the signal generators 116a and 124a is the same as was previously described in connection with the embodiment of FIGS. 1–3 and will not be further described herein to avoid prolixity of description.

If the control handle 18a is moved to a relatively large extent, the pointer 120a (FIG. 5A) is moved to a relatively large extent relative to a resistance 122a so that a relatively high voltage command signal is provided from the signal generator 116a. This relatively high voltage command signal is transmitted over a lead 250 to a bridge rectifier circuit 256 in the electrical control circuitry 210. A positive voltage output from the bridge rectifier 256 is transmitted to an amplifier 258 which is connected with a summing junction 260.

The summing junction 260 is connected with a feedback signal generator 264 having a pointer 266 connected with the swashplate 216 of the motor unit 40a (see FIG. 4). Movement of the pointer 266 varies the signal transmitted to the summing junction 260 over the lead 268 as a function of variations in the displacement of the motor unit 40a between the maximum displacement illustrated in FIG. 4 and a minimum displacement.

The electrical control circuitry 210 is effective to compare the magnitude of the command signal transmitted from the signal generator 116a with a motor displacement feedback signal transmitted from the signal generator 264 to determine if the displacement of the motor unit 40a corresponds to the position of the control handle 18a. If the motor displacement feedback signal does not correspond to the same displacement as the command signal, the electrical control circuitry 210 energizes one of the solenoids 240 or 242 (FIG. 5B) to actuate the main control valve assembly 212 to either an accelerate or decelerate condition in the same manner as in which the control circuitry 20 is effective to energize one of the solenoids 44 or 90 to actuate the control valve 22 to a forward or reverse actuated condition. If there is a relatively large difference between the displacement indicated by the command signal and the motor displacement feedback signal from the signal generator 264, the electrical control circuitry 210 energizes the rate control valve solenoid 246 to effect high speed operation of the swashplate motor assembly 214.

If the displacement of the motor unit 40a is the same as the displacement indicated by the position of the control handle 18a, a voltage follower amplifier 274 provides a predetermined reference voltage $V_1$ on a lead 276 in the same manner as previously described in connection with the amplifier 143 of the control circuitry 20. If the control handle 18a is moved from the neutral position to either a forward or reverse actuated condition corresponding to a relatively high speed output from the hydrostatic transmission 202, the displacement of the motor unit 40a is reduced to obtain the high speed output.

When the control handle 18a is moved through a relatively large distance from the neutral position, the main control valve assembly 212 is actuated to an accelerate condition. This effects operation of the swashplate motor assembly 214 (FIG. 4) to move the swashplate 216 and reduce the displacement of the motor 40a. The displacement of the motor unit 40a is reduced whether the control handle 18a is moved from the neutral position (illustrated in dashed lines in FIG. 4) to either a fully forward actuated position (shown in solid lines in FIG. 4) or a fully reverse actuated position. Therefore, the error signal voltage transmitted over the lead 276 is utilized to effect energization of the solenoid 242 when the control handle 18a is moved from the neutral position to either a fully forward or a fully reverse actuated position.

If the control handle 18a is moved from a fully forward or a fully reverse actuated position toward the neutral position with the motor unit 40a in a reduced displacement condition, an error signal is conducted over the lead 276. This error signal is effective to cause energization of the solenoid 240 to actuate the main valve assembly 212 to a decelerate condition. When this happens, the swashplate motor assembly 214 is effective to move the swashplate 216 in a clockwise direction (as viewed in FIG. 4) to increase the displacement of the motor unit 40a.

When the control handle 18a is moved through a small distance from the neutral position toward a fully forward actuated position, a positive command signal is provided over a lead 250. The command signal effects movement of the pump swashplate 30a from the neutral position toward the fully forward position of FIG. 4. At this time the motor swashplate 216 is in a maximum displacement position, illustrated in FIG. 4. Although the control circuitry 210 receives the command signal, corresponding to a relatively low output speed of the hydrostatic transmission 202, the motor swashpate 216 is maintained in a maximum displacement condition until the pump swashplate 30a reaches either a maximum forward or reverse displacement position. Therefore, only the displacement of the pump unit 14a is varied upon movement of the control handle 18a through a relatively small distance from the neutral position.

To effect movement of the swashplate 216 from the maximum displacement condition upon movement of the control handle 18a in either the forward or reverse direction from the neutral position, the absolute magnitude of the command signal voltage must correspond to a displacement which is less than the maximum displacement. The bridge circuit 256 rectifies the command signal so that only a positive voltage is applied to the noninverting terminal 280 of the amplifier 258. Therefore, the amplifier 258 always has a positive output signal whether the control handle 18 is moved in the forward or reverse directions.

The feedback signal generator 264 (FIG. 5A) cooperates with a phase sequence adjust circuit 283 having a potentiometer 284 to provide a feedback signal to the summing junction 260. The feedback signal from the phase sequence adjust circuit 283 and feedback signal generator 264 balance the command signal transmitted to the summing junction 260 only when the actual displacement of the motor unit 14a corresponds to the displacement indicated by the position of the control handle 18a. At this time, a voltage divider circuit 288 provides a voltage on the lead 276 of a magnitude equal to the reference voltage $V_1$. In one specific preferred embodiment of the invention, the reference voltage $V_1$ was equal to the reference voltage $V_0$ associated with the control circuitry 20 and 20a and had a positive magnitude of approximately 7.5 volts. However, it should be understood that voltages other than this specific reference voltage could be utilized if desired.

When the pump unit 14a is in a neutral condition and the control lever 18a is in a neutral position, the motor unit 40a is in the maximum displacement condition of FIG. 4. At this time the reference voltage $V_0$ conducted to the amplifiers 146a, 148a, 150a and 152a (FIG. 5B) in the pump unit control circuitry 20a is of a magnitude such that all of the amplifiers 146a-152a have positive outputs. Therefore, the solenoids 44a, 90a and 106a remain in a deenergized condition.

When the motor unit 40a is in the maximum displacement condition and the control handle 18a is in or close to the neutral position, the signal generator 116a provides a command signal of a voltage of an absolute magnitude which is less than the magnitude of the command signal corresponding to maximum displacement condition of the motor unit 40a. For example in one specific embodiment of the invention, the command signal from the signal generator was approximately zero volts when the control handle 18a was in the neutral position. Upon movement of the control handle 18a in a forward direction, the command signal increased to a value slightly greater than a positive 3 volts before the motor swashplate 116 moved from the maximum displacement position. Similarly upon movement of the control handle in the reverse direction, the command signal decreased to slightly less than a negative 3 volts before the motor swashplate moved from the maximum displacement position. Therefore, the motor swashplate 216 remains in the maximum displacement position until the command signal from the signal generator obtains an absolute magnitude of slightly more than 3 volts. It should be understood that the foregoing recitations of specific voltages is merely for purposes of clarity of illustration and that the invention is not to be limited to these specific voltages since other voltages could be utilized.

When the absolute magnitude of the command signal voltage is less than the voltage corresponding to the maximum displacement position of the motor swashplate 216, the control valve assembly 212 is maintained in a decelerated condition porting fluid under pressure from the conduit 227 to the conduit 234 to urge the motor swashplate 216 against the stop 279. Thus, when the control handle 18a is in the neutral position or in a forward or reverse actuated position closely adjacent to the neutral position, an error signal of a voltage less than the reference voltage $V_1$ is provided on the lead 276. This relatively low voltage effects a reduction in the output voltage of the amplifier 292 to render the transistor 300 conducting. This results in energization of the solenoid 240 to maintain the control valve 212 in the decelerate condition. If the absolute magnitude of the command signal is smaller than a predetermined amount, the amplifier 296 will have a relatively low voltage output so that the rate control valve solenoid 246 is also energized. It should be noted that energization of the rate control valve solenoid 246 does not effect movement of the swashplate 216 since it is disposed in abutting engagement with the stop 279.

Upon rapid movement of the control handle 18a from the neutral condition to a fully forward actuated condition with the pump unit 14a in the neutral displacement condition, the voltage of the output from the amplifier 146a (FIG. 5B) is reduced so that the transistor 154a is rendered conducting to effect energization of the solenoid 44a. This effects operation of the swashplate motor assembly 26a to increase the displacement of the pump 14a in the manner previously explained in connection with the embodiment of the invention illustrated in FIGS. 1-3. At the same time, the increased voltage of the command signal is transmitted to the rectifier bridge 256 (FIG. 5A) and results in an increase in the voltage output from the amplifier 258. Of course, this increases the voltage of the output from the amplifier 274 and raises the voltage on the lead 276.

The increased voltage on the lead 276 is applied to the terminal 320 of the amplifier 292 to effect deenergization of the solenoid 240. In addition, the increased voltage is applied to an inverting terminal 308 (FIG. 5B) of the amplifier 294 to render the transistor 302 conducting. This effects energization of the pilot valve solenoid 242 and operation of the main control valve 212 to port fluid to the conduit 228 (see FIG. 4) to effect a decrease in the displacement of the motor unit 40a as the displacement of the pump unit 14a is being increased.

The increased error signal voltage is also applied to an inverting terminal 312 of the amplifier 298. If the displacement of the motor unit 40a is less than the displacement indicated by the position of the control handle 18a by more than a predetermined amount, the voltage of the error signal conducted to the inverting terminal 312 of the amplifier 298 is of sufficient magnitude to cause the output of the amplifier 298 to change to a relatively low voltage. This relatively low voltage dominates the output of the amplifier 296 to render the transistor 304 conducting. This energizes the rate control valve solenoid 246 to open the rate control valve 220. Upon opening of the rate control valve 220, the swashplate motor assembly 214 is operated at a relatively high speed to decrease the displacement of the motor unit 40a toward a displacement corresponding to the position of the control handle 18a.

As the displacement of the motor unit 40a approaches the displacement indicated by the control handle 18a, the voltage of the error signal approaches the reference voltage $V_1$. When the error signal is slightly greater than the reference voltage, the displacement of the motor unit 40a is greater than the displacement indicated by the position of the control handle 18a by a predetermined relatively small amount. The next increment of movement of the swashplate 216 causes the error signal voltage to fall below the threshold voltage of the amplifier 298. This results in the voltage on a lead 314 being increased to render the transistor 304 nonconducting so that the rate control valve solenoid 246 is deenergized.

Upon deenergization of the rate control valve solenoid 246, the rate control valve 220 is closed to decrease the rate of flow of fluid to the swashplate motor assembly 214. This results in relatively slow operation of the swashplate motor assembly 214 to move the swashplate 216 of the motor unit 40a toward the position corresponding to the displacement indicated by the control handle 18a. When this position is reached, the voltage on the lead 276 is equal to the reference voltage $V_1$ and the transistor 302 is rendered nonconducting to deenergize the solenoid 242 and effect operation of the control valve assembly 212 from an accelerate condition to a neutral condition blocking fluid flow to and from the swashplate motor assembly 214.

When the high forward operating speed of the hydrostatic transmission 202 is to be decreased, the control handle 18a is moved in a counterclockwise direction from the forward actuated condition shown in solid lines in FIG. 4 toward the neutral actuated position shown in dashed lines in FIG. 4. As this occurs, the command signal voltage conducted to the bridge circuit 256 (FIG. 5A) is decreased. This results in a decrease in the signal transmitted to the summing junction 260 from the voltage follower amplifier 258. The resulting decrease in the voltage transmitted from the amplifier 274 to the lead 276 reduces the voltage applied to the noninverting terminal 320 (FIG. 5B) of the amplifier 292. This decreases the output signal from the amplifier 292 to render the transistor 300 conducting. This results in energization of the pilot valve solenoid 240.

Upon energization of the pilot valve solenoid 240, the directional control valve assembly 212 is actuated to a decelerate condition in which fluid under pressure is conducted through a conduit 234 (FIG. 4) to the cylinder 236 of the swashplate motor assembly 214. This effects movement of the swashplate 216 toward a maximum displacement condition to thereby reduce the forward operating speed of the hydrostatic transmission 202.

The decreased voltage of the error signal is also applied to a noninverting terminal 324 (FIG. 5B) of the amplifier 296. If the actual displacement of the motor unit 40a is less than the displacement indicated by the position of the control handle 18a by more than a predetermined amount, the voltage of the error signal will be less than the reference voltage by an amount sufficient to cause the amplifier 296 to have a relatively low output. When this occurs, the output of the amplifier 296 dominates the output of the amplifier 298 and renders the PNP transistor 304 conducting. This energizes the rate control valve solenoid 246 to operate the rate control valve 220.

Operation of the rate control valve 220 results in relatively high speed operation of the swashplate motor assembly 214 to quickly increase the displacement of the motor unit 40a toward the displacement indicated by the position of the control handle 18a. When the displacement of the motor unit 18a is just slightly less than the displacement indicated by the position control handle 18a, the error signal voltage has increased to a voltage which is more than the threshold of the amplifier 296 so that the transistor 304 is rendered nonconducting. This results in de-energization of the rate control valve solenoid 246 and relatively low speed operation of the swashplate motor assembly 214 to move the swashplate 216 through the final distance to the position corresponding to the position of the control handle 18a. When the swashplate 216 reaches this position, the error signal voltage on the lead 276 will again be equal to the reference voltage $V_1$ and the output of the amplifier 292 will become positive with a resulting de-energization of the pilot valve solenoid 240 so that the main valve assembly 212 is again effective to block fluid flow to and from the swashplate motor assembly 214.

If the output speed of the hydrostatic transmission 202 is to be reduced by a relatively large amount, the reduction in the voltage in the command signal is sufficient to cause the amplifier 148a to render the transistor 158a (see FIG. 5B) conducting to energize the pilot valve solenoid 90a. Upon energization of the pilot valve solenoid 90a, the main valve assembly 22a is operated to a reversed actuated condition to effect operation of the swashplate motor assembly 26a to reduce the forward operating displacement of the pump unit 14a in the manner previously explained.

Upon movement of the control handle 18a from a neutral position to a fully reverse actuated position, the command signal from the voltage signal generator 16a is reduced to a relatively large negative voltage. The rectifier bridge 256 rectifies the negative voltage so that a positive voltage is applied to the noninverting terminal 280 of the amplifier 258. This results in operation of the control circuitry 210 to decrease the displacement of the motor unit 40a in the same manner as previously explained in connection with forward operation of the hydrostatic transmission 202. Similarly, when the control handle 18a is moved from a fully actuated reverse operating position toward the neutral position, the decrease in the magnitude of the negative command signal transmitted over the lead 250 results in a decrease in the signal transmitted from the amplifier 258 to the summing junction 260 with a resulting decrease in the error signal. This results in operation of the control circuitry 210 to effect an increase in the displacement of the motor unit 40a in the same manner as previously described in forward operation of the motor unit 40a.

In view of the foregoing description, it can be seen that the control system 10 (FIGS. 1–3) includes a feedback signal generator 124 which provides an electrical output signal indicative of the actual operating displacement of the pump unit 14. A second signal generator 116 provides a command signal indicative of a selected displacement of the pump unit 14. These two signals are compared and an error signal is provided if the actual displacement of the pump unit 14 is not the same as the displacement corresponding to the position of the control handle 18.

Upon the occurrence of an error signal, one of the pilot valve solenoids 44 or 90 is energized to effect operation of the directional control valve 58 (FIG. 2) to a forward or reverse operating condition. Operation of the directional control valve enables fluid to flow at a relatively low rate through the orifice 112 to the swashplate motor assembly 26. If there is a relatively large difference between the selected displacement of the pump unit 14 and the actual displacement, the rate control valve solenoid 106 is energized to effect operation of the rate control valve 34 to an open condition. Opening the rate control valve 34 increases the rate of flow of fluid to the swashplate motor assembly 26 to enable it to quickly move the swashplate 30 toward the desired position.

When the displacement of the pump unit 14 approaches the desired displacement, the rate control valve 34 is closed so that the rate of fluid flow to the swashplate motor assembly 26 is reduced. Of course, this reduces the rate at which the swashplate 30 is moved with a resulting reduction in the rate of change of the operating displacement of the pump unit 14. Therefore, the swashplate 30 can be slowly and accurately moved to a position in which the pump unit 14 has a displacement corresponding to the position of the control handle 18. When the swashplate reaches this position, the error signal is substantially zero and directional control valve returns to the closed position blocking fluid flow to and from the swashplate motor assembly.

Figure 5A:
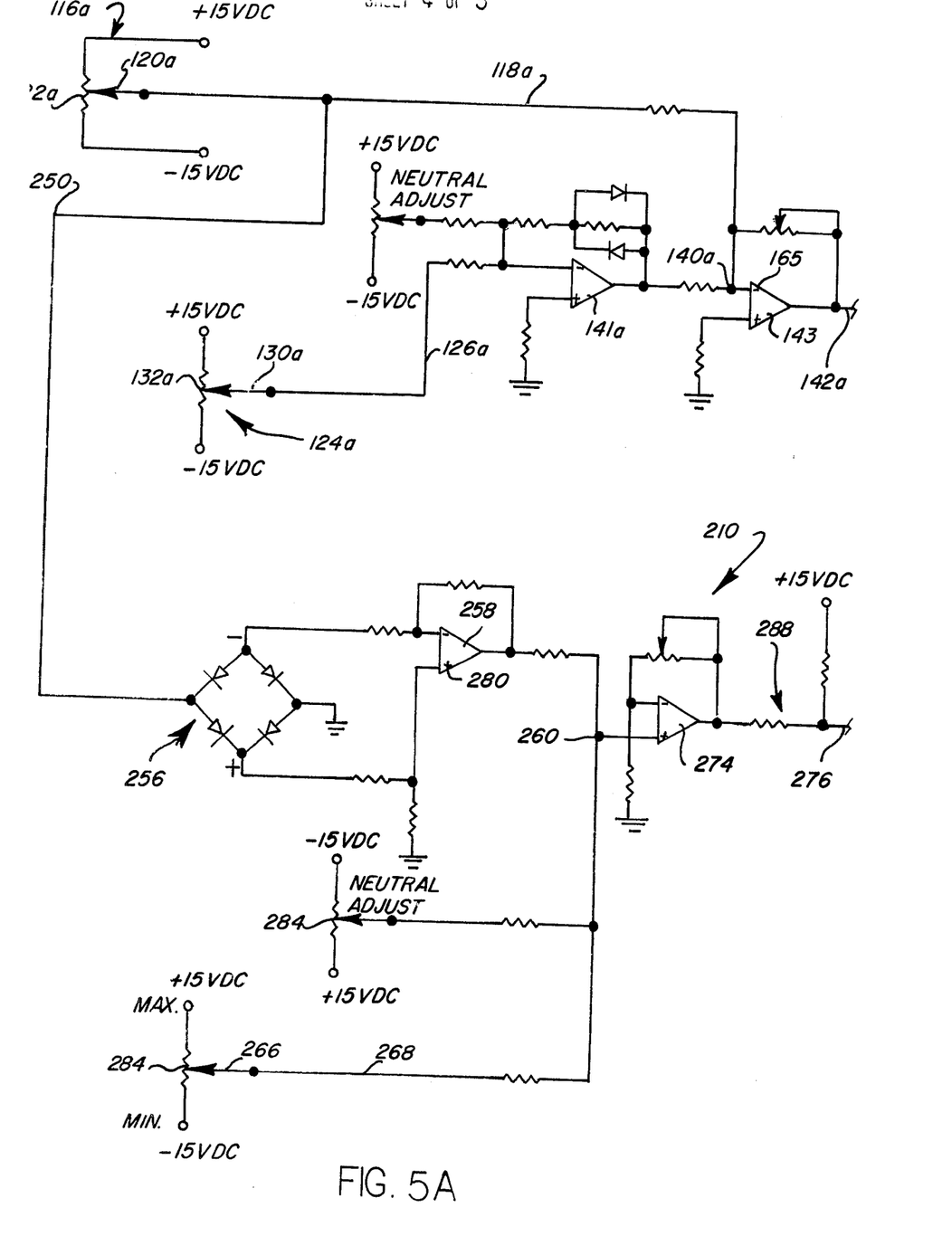
FIGS. 5A and 5B are schematic illustrations of electrical control circuitry utilized in the hydrostatic transmission control system of FIG. 4.
Figure 5B:
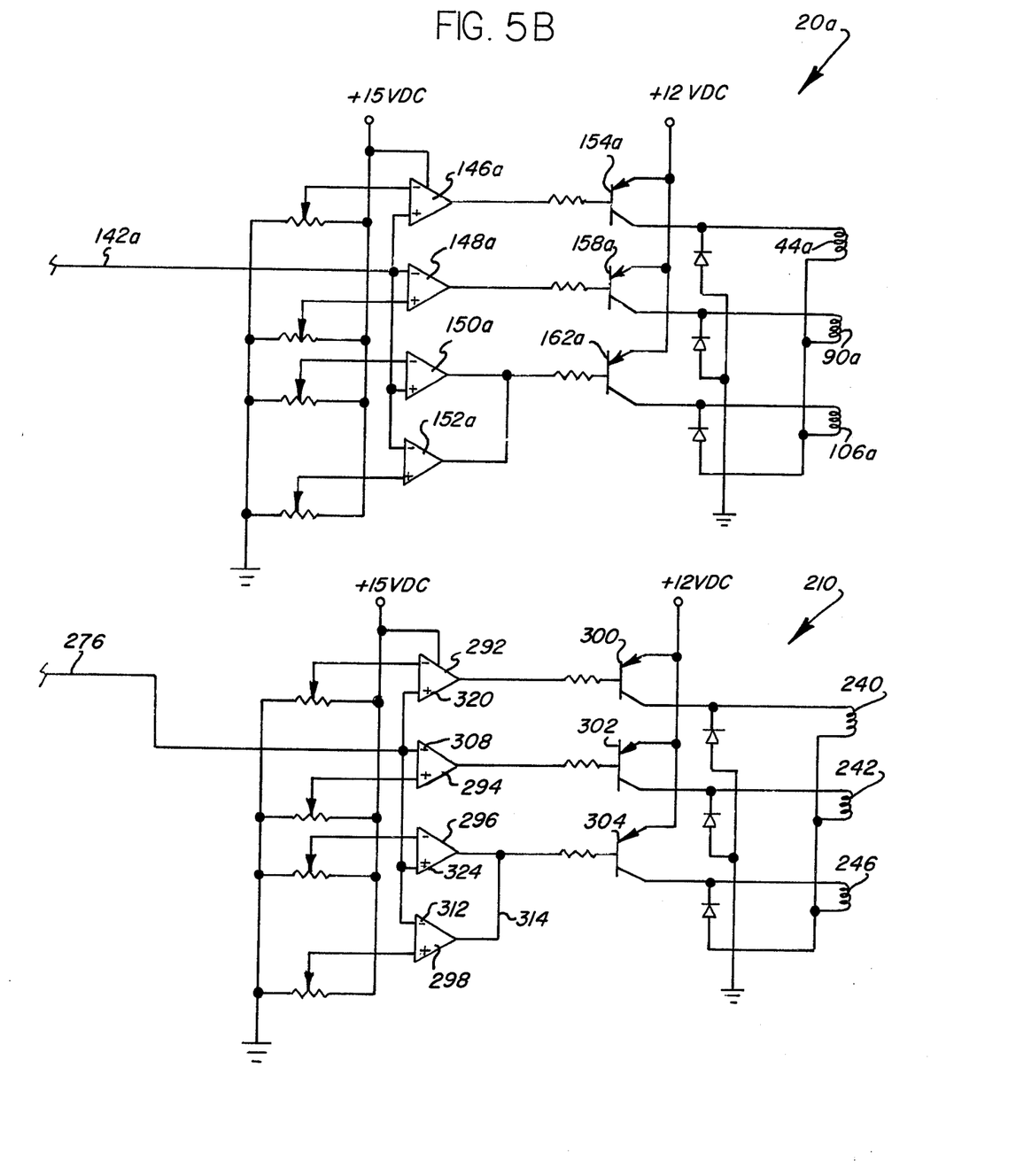

In the embodiment of the invention illustrated in FIGS. 4 and 5, the displacement of both a pump unit 14a and a motor unit 40a can be varied. The rate control valves 34a and 220 enable the pump swashplate 30a and and motor swashplate 216 to be quickly moved toward positions corresponding to the position of the control handle 18a. The rate control valves 34a and 220 are then closed to enable the swashplates 34a and 216 to be slowly and accurately positioned.

It should be understood that the specific electrical and hydraulic control arrangement disclosed herein could be modified. For example, a plurality of rate control valves and associated restrictions could be utilized in association with the directional control valve. The directional control valve could be actuated between its various operating conditions directly by solenoids rather than by use of pilot valves. In addition, the electrical controls could be varied to provide an error signal of a type other than the variable voltage signal provided by the electrical controls 20. It is contemplated that the signal generator 116 could have an input other than the control handle 18, for example a prerecorded program could be utilized to effect operation of the signal generator 116 to provide a command signal corresponding to a selected displacement.

Having described specific preferred embodiments of the invention, the following is claimed:

1. An apparatus comprising a hydrostatic transmission, said hydrostatic transmission including a pump unit connected in fluid communication with a motor unit, first actuator means for varying the displacement of one of said units, first means for providing a first electrical signal indicative of the displacement of said one unit, second means for providing a second electrical signal indicative of a selected displacement of said one unit, means for providing a first electrical output signal which indicates whether the displacement of said one unit differs from the selected displacement and whether the magnitude of this difference is more than a predetermined amount, control means for effecting operation of said first actuator means at a high rate when said first electrical output signal indicates that the displacement of said one unit differs from the selected displacement by at least said predetermined amount and for effecting operation of said first actuator means at a low rate which is slower than said high rate when said first electrical output signal indicates that the displacement of said one unit differs from the selected displacement by an amount which is less than said predetermined amount, second actuator means for varying the displacement of the other of said units, third means for providing a third electrical signal indicative of the displacement of said other unit, said second means including means for providing an electrical signal indicative of a selected displacement of said other unit, and means connected with said second and third means for providing a second electrical output signal which indicates whether the displacement of said other unit differs from the selected displacement and whether the magnitude of this difference is more or less than a second predetermined amount, said control means including means for effecting operation of said second actuator means at a high rate when said second electrical output signal indicates that the displacement of said other unit differs from the selected displacement by at least said second predetermined amount and for effecting operation of said second actuator means at a low rate which is slower than said high rate of operation of said second actuator means when said second electrical output signal indicates that the displacement of said other unit differs from the selected displacement by an amount which is less than said second predetermined amount.

2. An apparatus as set forth in claim 1 further including manually actuatable means for effecting operation of said second means to vary said second electrical signal and the indicated selected displacement of said one unit, said manually actuatable means also being operable to effect a variation in the electrical signal indicative of the selected displacement of said other unit.

3. An apparatus as set forth in claim 1 wherein said first and second actuator means each includes a hydraulic motor, said control means including means for conducting fluid to said hydraulic motors in said first and second actuator means at relatively high flow rate to effect operation of said first and second actuator means at their high rates and for conducting fluid to said hydraulic motor in at least one of said actuator means at a relatively low flow rate to effect operation of said one of said actuator means at its low rate.

4. An apparatus as set forth in claim 1 wherein said first actuator means includes a first hydraulic motor, said control means including first valve means operable between a closed condition blocking fluid flow to and from said first hydraulic motor and an open condition enabling fluid to flow to said first hydraulic motor, and means for effecting operation of said first valve means from the closed condition to the open condition in response to an electrical output signal from said means for providing a first electrical output signal, said second actuator means including a second hydraulic motor, said control means including second valve means operable between a closed condition blocking fluid flow to and from said second hydraulic motor and an open condition enabling fluid to flow to said second hydraulic motor, and means for effecting operation of said second valve means from the closed condition to the open condition in response to an electrical output signal from said means for providing a second electrical output signal.

5. An apparatus comprising a hydrostatic transmission, said hydrostatic transmission including a pump unit connected in fluid communication with a motor unit, fluid motor means for varying the displacement of one of said units, first valve means operable between a closed condition and an open condition in which fluid is conducted to said fluid motor means, second valve means operable between a first condition in which fluid is conducted to fluid motor means at a first rate and a second condition in which fluid is conducted to said fluid motor means at a second rate which is less than said first rate, detector means for detecting when the displacement of said one unit is closely approaching a selected displacement during operation of said fluid motor means with said first valve means in said open condition and said second valve means in said first condition, and control means for effecting operation of said second valve means from said first condition to said second condition in response to detection by said detector means that the displacement of said one unit is closely approaching the selected displacement.

6. An apparatus as set forth in claim 5 wherein said first valve means includes pressure responsive valve means operable between open and closed positions in response to variations in a control fluid pressure and pilot valve means for varying the control fluid pressure.

7. An apparatus as set forth in claim 5 wherein said detector means includes a first potentiometer, means for varying the output of said first potentiometer in response to variations in the displacement of said one unit, a second potentiometer, means for varying the output of said second potentiometer in response to variations in the predetermined displacement, and means for detecting when the output of said first potentiometer is closely approaching a predetermined function of the output of said second potentiometer.

8. An apparatus as set forth in claim 7 wherein said means for detecting when the output of said first potentiometer is closely approaching the output of said second potentiometer includes means for providing an error signal which varies when the output of said first potentiometer closely approaches the output of said second potentiometer.

9. An apparatus as set forth in claim 5 further including first orifice means for limiting the rate of fluid flow to said first valve means to said second fluid flow rate when said second valve means is in the second condition.

10. An apparatus as set forth in claim 9 further including second orifice means for conducting fluid to said first valve means at said first rate when said second valve means is in said first condition.

11. An apparatus as set forth in claim 9 further including means for adjusting said first orifice means to vary said second fluid flow rate.

12. An apparatus as set forth in claim 5 wherein said fluid motor means including a plurality of relatively movable components around which fluid leaks at a rate which is less than said second fluid flow rate.

13. An apparatus as set forth in claim 5 further including second fluid motor means for varying the displacement of the other of said units, third valve means operable between a closed condition and an open condition in which fluid is conducted to said second fluid motor means, fourth valve means operable between a first condition in which fluid is conducted to said second fluid motor means at one rate and a second condition in which fluid is conducted to said second fluid motor means at another rate which is less than said one rate, said detector means including means for detecting when the displacement of said other unit is closely approaching a selected displacement during operation of said second fluid motor means with said third valve means in said open condition and said fourth valve means in said first condition, and said control means including means for effecting operation of said fourth valve means from said first condition to said second condition in response to detection by said detector means that the displacement of said other unit is closely approaching the selected displacement.

14. An apparatus comprising a hydrostatic transmission, said hydrostatic transmission including a pump unit connected in fluid communication with a motor unit, fluid motor means for varying the displacement of one of said units, first means for providing a first electrical signal indicative of the displacement of said one unit, second means for providing a second electrical signal indicative of a selected displacement of said one unit, means for providing an electrical output signal which indicates whether the displacement of said one unit differs from the selected displacement, and control means for effecting operation of said fluid motor means when said electrical output signal indicates that the displacement of said one unit differs from the selected displacement, said control means including a valve member movable through a predetermined distance between a closed position blocking fluid flow to said fluid motor means and a fully open position enabling fluid to flow to said fluid motor means, and means for effecting movement of said valve member through said predetermined distance from said closed position to said fully open position when said electrical output signal indicates that the displacement of said one unit differs from the selected displacement and for effecting movement of said valve member through said predetermined distance from said fully open position to said closed position when said electrical output signal indicates that the displacement of said one unit is at least substantially equal to the selected displacement.

15. An apparatus as set forth in claim 14 wherein said means for effecting movement of said valve member includes coil means energizable to provide a magnetic field and means movable under the influence of a magnetic field eminating from said coil means upon energization of said coil means.

16. An apparatus as set forth in claim 14 further including means for effecting operation of said second means to vary the second electrical signal through a range in which the displacement of the one unit differs from the selected displacement by varying amounts, said means for effecting movement of said valve member being operable to effect movement of said valve member between the open and closed positions at substantially the same rate regardless of the difference between the displacement of said one unit and the selected displacement.

17. An apparatus as set forth in claim 14 wherein said means for providing an electrical output signal includes means for providing an electrical output signal which has a first characteristic when the displacement of said one unit is equal to the selected displacement and a second characteristic when said one unit has a displacement which is different than the selected displacement, said means for effecting movement of said valve member including means for moving said valve member through said predetermined distance in response to a change in the output signal between said first and second characteristics.

18. An apparatus comprising a hydrostatic transmission, said hydrostatic transmission including a pump unit connected in fluid communication with a motor unit, actuator means for varying the displacement of one of said units, said actuator means including a reversible hydraulic motor, first means for providing a first electrical signal indicative of the displacement of said one unit, second means for providing a second electrical signal indicative of a selected displacement of said one unit, means for providing an electrical output signal which indicates whether the displacement of said one unit differs from the selected displacement, and control means for effecting operation of said actuator means when said electrical output signal indicates that the displacement of said one unit differs from the selected displacement, said control means including a directional control valve connected in fluid communication with said hydraulic motor, said directional control valve being operable under the influence of fluid pressure from an unactuated condition to a first actuated condition to effect operation of said hydraulic motor in a first direction to decrease the displacement of said one unit, said directional control valve being operable under the influence of fluid pressure from the unactuated condition to a second actuated condition to effect operation of said hydraulic motor in a second direction to increase the displacement of said one unit, first pilot valve means connected in fluid communication with said directional control valve, said first pilot valve means being operable from an unactuated condition to an actuated condition to port fluid pressure to said directional control valve and effect operation of said directional control valve from the unactuated condition to the first actuated condition, and second pilot valve means connected in fluid communication with said directional control valve, said second pilot valve means being operable from an unactuated condition to an actuated condition to port fluid pressure to said directional control valve and effect operation of said directional control valve from the unactuated condition to the second actuated condition.

19. An apparatus as set forth in claim 18 wherein said control means includes a rate control valve connected in fluid communication with said directional control valve, said rate control valve being operable from a first condition to a second condition to increase the rate of flow of fluid from said directional control valve to said hydraulic motor when said directional control valve is in one of its actuated conditions, said control means further including means for effecting operation of said rate control valve from the first condition to the second condition when said electrical output signal indicates that the displacement of said one unit differs from the selected displacement by at least a predetermined amount and for effecting operation of said rate control valve from the second condition to the first condition when said electrical output signal indicates that the displacement of said one unit differs from the selected displacement by an amount which is less than the predetermined amount.

* * * * *

UNITED STATES PATENT OFFICE
CERTIFICATE OF CORRECTION

Patent No. 3,901,031          Dated August 26, 1975

Inventor(s) KENNETH K. KNAPP, Et Al.

It is certified that error appears in the above-identified patent and that said Letters Patent are hereby corrected as shown below:

Column 17, line 11: After "relatively" the word should read -- low --.

Signed and Sealed this sixth Day of April 1976

[SEAL]

Attest:

RUTH C. MASON
*Attesting Officer*

C. MARSHALL DANN
*Commissioner of Patents and Trademarks*